July 12, 1927.     C. SAUZEDDE     1,635,505
HUB LOCKING DEVICE FOR WHEELS
Filed June 14, 1926     2 Sheets-Sheet 1
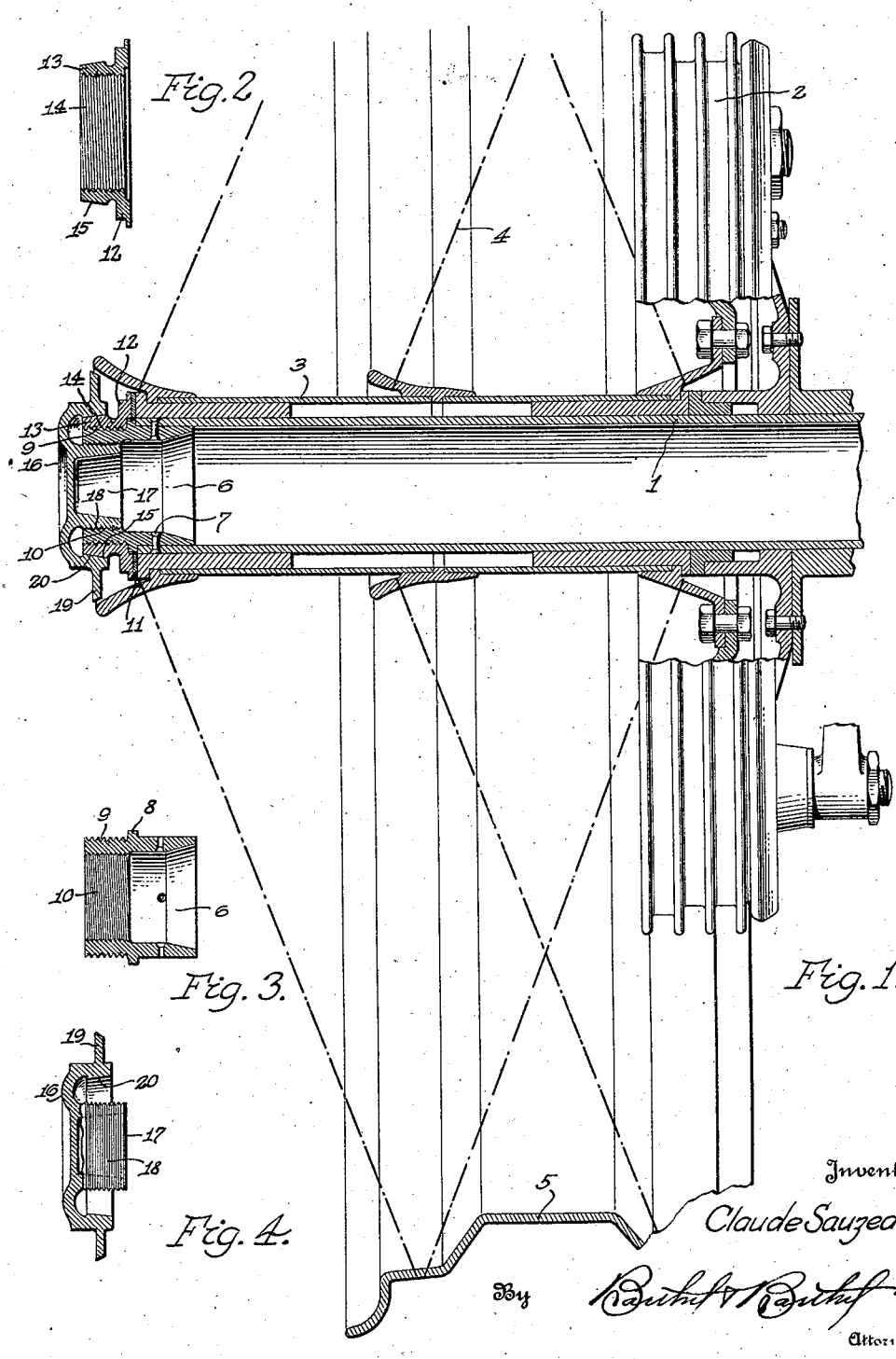
Inventor
Claude Sauzedde,
By
Attorneys July 12, 1927. 1,635,505
C. SAUZEDDE
HUB LOCKING DEVICE FOR WHEELS
Filed June 14, 1926 2 Sheets-Sheet 2

Inventor
Claude Sauzedde,

By

Attorneys

Patented July 12, 1927.

1,635,505

UNITED STATES PATENT OFFICE.

CLAUDE SAUZEDDE, OF DETROIT, MICHIGAN.

HUB-LOCKING DEVICE FOR WHEELS.

Application filed June 14, 1926. Serial No. 115,778.

In my companion application filed under even date, there is disclosed a novel wire wheel adapted for mounting on the end of an axle, and ordinarily a nut, hub cap or other device is mounted on the outer end of the axle to retain the wheel thereon. On account of the wheel being subjected to lateral stresses and strains there is a tendency for the wheel holding devices to become detached and this often results in a serious accident.

The primary object of this invention is to provide a locking device by which a wheel hub may be positively retained on the axle, against lateral displacement, yet permit of the wheel being easily and quickly demounted at will.

Another object of this invention is to provide a locking device embodying three members constructively arranged and joined so that any tendency of either of two of said members to become displaced is resisted by the other of the two of said members, and in consequence of this novel arrangement, it is practically impossible for stresses and strains, vibrations or the rotary action of one member relative to another to cause dislodgment of the locking device.

A further object of this invention is to provide a simple, durable and inexpensive locking device capable of general use, and the construction entering into the device will be hereinafter specifically described and then claimed.

Reference will now be had to the drawing, wherein

Figure 1 is a longitudinal sectional view of a wheel hub provided with a locking device;

Fig. 2 is a longitudinal sectional view of a detached intermediate member;

Fig. 3 is a longitudinal sectional view of an inner member;

Fig. 4 is a similar view of an outer member.

Figure 5:
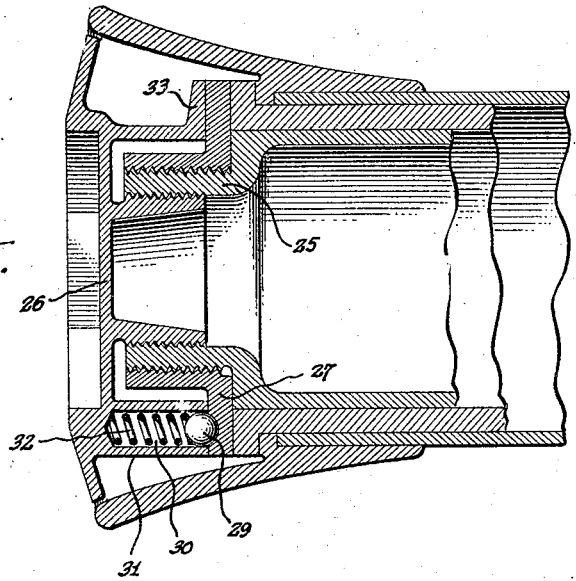
Fig. 5 is a longitudinal sectional view of a wheel hub showing another form of locking device.

In the drawing the reference numeral 1 denotes, by the way of an example, the end of a tubular axle having a brake drum 2, a demountable hub 3, and spokes 4 supporting a rim 5.

To retain the demountable wheel hub 3 on the axle 1, the outer end of the axle is provided with an inner member 6 which is riveted or otherwise fixed, as at 7, to the axle 1 adjacent the outer end thereof. The inner member 6 has a collar 8 intermediate the ends thereof and adapted to abut the end of the tubular axle with approximately half of the inner member within the tubular axle to firmly brace the walls thereof and afford a substantial connection between the axle and the inner member. That portion of the inner member protruding from the tubular axle has exterior screw threads of a greater pitch than the interior screw threads 10. The difference in pitch or kind is essential, as will hereinafter appear.

Abutting the outer ends of the hub 3 is a gasket 11 and engaging the gasket 11 is the peripheral tool engaging flange 12 of an intermediate member 13, which is interiorly screw-threaded, as at 14, so that it may be screwed on the exterior threads 9 of the inner member 6. The outer wall of the intermediate member 13 is tapered outwardly towards the outer end of said intermediate member to form a conical seat 15, best shown in Fig. 2.

To prevent accidental rotation of the intermediate member 13 on the inner member 6, an outer cap-like member 16 is employed. This member has a central hollow boss 17 with its interior wall provided with screw-threads 18, said screw threads corresponding to the screw threads 10 of the inner member 6, so that the boss 17 can be screwed into the inner member 6. The outer member 16 is formed with a peripheral flange 19 which serves somewhat as a closure for the outer ends of the wheel hub 3. See Fig. 1. The outer member 16 is also formed with an interior conical wall 20 adapted to engage the conical seat 15 of the intermediate member 13, and it is by virtue of said contacting wall and seat that the intermediate and outer members are bound together relative to the inner member 6.

Should the intermediate member 12 attempt to rotate, under the influence of the wheel hub 3, it will tend to rotate the outer member 16, by reason of the contacting seat 15, and the wall 20, but since the pitch of the screwthreads 10 and 18 is different from the pitch of the screwthreads 9 and 14, the outer member 16 cannot rotate and will therefore prevent rotation of the intermediate member 13. There are no stresses or strains exerted on the outer member 16 that would cause it to rotate independent of the inner member 6 or the intermediate member 13 and become detached, and since the outer member is only under the influence of the intermediate member, the outer member serves as a lock for the intermediate member, yet permits of the member being removed at will when occasion so requires.

Figure 6:
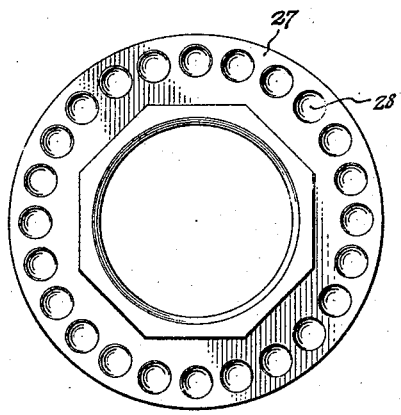
Fig. 6 is a view of the outer face of an intermediate member.
Figure 7:
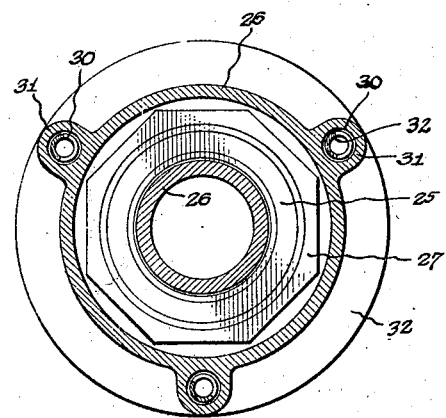
Fig. 7 is a cross sectional view of the locking device in Fig. 5.

Reference will now be had to Figs. 5 to 7 inclusive wherein 25 is an inner member interiorly screwthreaded to receive an outer member 26 and exteriorly screwthreaded to receive an intermediate member 27, there being a difference of about two threads between the threaded portions of the inner member. The intermediate member 27 has its outer face provided with a series of circumferentially arranged depressions or recesses 28 and adapted to engage in these depressions are spherical or otherwise shaped detents 29 arranged in pockets 30 formed in bosses 31 carried by the outer member 26. In the pockets 30 are coiled expansion springs 32 which bear against the detents 29 and hold the detents in engagement with the intermediate member 27, yet permit of said detents yielding as the outer member is rotated relative to the other members. The outer member 26 has a peripheral flange 33 which bears against the intermediate member 27, and this locking device is structurally different from the device previously described, but involves the same locking principle in addition to the detents which serve as locking means for securing the outer member against rotation.

It is thought that the utility of my locking device will be apparent without further description, and while in the drawing there is illustrated the preferred embodiment of my invention, in connection with a wheel hub, yet it is to be understood that the interlocking members are susceptible of general use and such structural changes as are permissible by the appended claims.

What I claim is:—

1. The combination with an axle and a wheel hub detachably mounted thereon, of an inner member attached to said axle, an intermediate member screwed on said inner member to retain said wheel hub on said axle, and an outer member screwed in said inner member and against said intermediate member.

2. The combination called for in claim 1, wherein the screw connection between said inner and intermediate members is of greater pitch than the screw connection between said inner and outer members.

3. The combination called for in claim 1, wherein said intermediate member has a conical seat for a wall of said outer member.

4. Means adapted for locking a wheel hub on an axle, said means comprising an inner member secured to the axle, a hub engaging intermediate member connected to said inner member, and an outer member connected to said inner member, said intermediate member bearing against said outer member and the connections between all of said members being such that any movement of said intermediate member tends to bind the connection between said inner and outer members.

5. A locking device comprising an inner fixed member, an intermediate member screwed on said inner member and having a tendency to back off of said inner member, and an outer member screwed in said inner member and inclosing said intermediate member, by bearing on said intermediate member, the screw connections between said members being such that movement of said intermediate member binds the screw connection of said inner and outer members.

6. The combination with an axle and a wheel hub detachably mounted thereon, of an inner member attached to said axle, an intermediate member screwed on said inner member to retain said wheel hub on said axle, an outer member screwed in said inner member against said intermediate member, and means carried by said outer member and engaging said intermediate member and adapted for securing said outer member in any adjusted position relative to said intermediate member.

7. The combination called for in claim 6, wherein said means includes a plurality of detents yieldably supported by said outer member.

In testimony whereof I affix my signature.

CLAUDE SAUZEDDE.